US006885789B2

(12) United States Patent
Liu (10) Patent No.: US 6,885,789 B2
(45) Date of Patent: Apr. 26, 2005

(54) OPTICAL SWITCH FABRICATED BY A THIN FILM PROCESS

(75) Inventor: Kuo-Chuan Liu, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 10/165,087

(22) Filed: Jun. 7, 2002

(65) Prior Publication Data

US 2003/0228088 A1 Dec. 11, 2003

(51) Int. Cl.[7] .............................................. G02B 6/26
(52) U.S. Cl. ............................ 385/16; 385/15; 385/14; 257/437
(58) Field of Search .......................... 257/437; 385/16, 385/17, 18, 14, 15

(56) References Cited

U.S. PATENT DOCUMENTS

| 4,418,980 | A | 12/1983 | Keil et al. |
| 4,547,262 | A | 10/1985 | Spillman, Jr. et al. |
| 5,070,026 | A | 12/1991 | Greenwald et al. |
| 5,140,454 | A | 8/1992 | Shibaguchi |
| 5,194,548 | A | 3/1993 | Yoshimura |
| 5,212,583 | A | 5/1993 | Vali et al. |
| 5,272,561 | A | 12/1993 | Shibaguchi |
| 5,289,001 | A | 2/1994 | Arimoto et al. |
| 5,329,507 | A | 7/1994 | Nelson et al. |
| 5,444,567 | A | 8/1995 | Kataoka |
| 5,633,527 | A | 5/1997 | Lear |
| 5,786,926 | A | 7/1998 | Yamada |
| 5,852,703 | A | 12/1998 | Nashimoto |
| 5,894,363 | A | 4/1999 | Yamada et al. |
| 6,057,955 | A | 5/2000 | Yamamoto |
| 6,175,667 | B1 | 1/2001 | Wang et al. |
| 6,504,966 | B1 * | 1/2003 | Kato et al. ................... 385/16 |

OTHER PUBLICATIONS

Y. Tetsuzo et al., "Programmable Optical IC", JP62194219A, Published Aug. 26, 1987.
Y. Tetsuzo et al., "Waveguide Type Electro Optic Device", JP04291328A, Published Oct. 15, 1992.
Syms et al. Development of the SC–RTA Process for Fabrication of Sol–Gel Based Silica–on–Silicon Integrated Optic Components, Journal of Sol–Gel Science and Technology 13, pp. 509–516 (1998).

* cited by examiner

Primary Examiner—John R. Lee
Assistant Examiner—David A. Vanore
(74) Attorney, Agent, or Firm—Sheppard Mullin Richter & Hampton LLP (57) ABSTRACT

An electro-optical switch is provided, that includes: a single mode optical waveguide having a thin ferroelectric oxide film for propagating a single mode of light; a coupler adjoining the single mode optical waveguide for coupling a part of the single mode of light from an optical fiber to the single mode optical waveguide; an electrically formed lens in the single mode optical waveguide for collimating the single mode of light from the coupler; and a switching module comprising another electrically formed lens in the single mode optical waveguide, for switching the single mode of light.

15 Claims, 6 Drawing Sheets

OPTICAL SWITCH FABRICATED BY A THIN FILM PROCESS

FIELD OF THE INVENTION

The invention relates generally to the field of optical switching devices, and in particular to an electro-optical (EO) switch having a thin ferroelectric oxide waveguide and operating on a single mode light signal.

BACKGROUND OF THE INVENTION

The increased use of the Internet has created the demand for higher data transfer rates, and greater bandwidth. One solution to meeting this demand is the use of all optical networks having fiber optic cables carrying data in the form of light signals routed by optical switches. As used herein an optical switch operates directly on a light signal during switching rather than first converting the light signal to an electrical signal, using a conventional electronic network switch for routing the signal, and then converting the switched electrical signal back to a light signal.

In optical networks there are two types of fiber optic cables: single mode and multi-mode. A single mode fiber is a glass fiber with a diameter of 8 to 10 microns or less that has one mode of transmission—i.e., only one light signal is propagated in the fiber. In a single mode fiber, only the lowest order mode propagates at the wavelength of interest, typically 1300 to 1320 nanometers (nm) or in the 1550 nm range. Single mode fiber allows for a high data transmission rate, e.g., above 10 gigabit per second (Gb/s), longer transmission distance, and the signal distortion and attenuation is small compared to a multi-mode fiber.

While single mode fiber optic cable is readily available, all optical single mode switches are still under development. One type of all optical single mode switch is a planar electro-optical (EO) switch having a slab waveguide. Light travelling in the waveguide can be bent, when an electric field is generated by electrodes, with a voltage difference, located on opposite sides of the waveguide. One material researched for use as the slab waveguide is a transparent ferroelectric oxide, for example, lithium niobate, barium titanate, lead zircornium titanate (PZT), lead lanthanum zirconium titanate (PLZT), and strontium barium niobate (SBN). When an electric field is applied across the transparent ferroelectric oxide, the refractive index changes depending on the strength of the electric field, and hence a light signal propagating in the ferroelectric oxide material can be bent.

Although an EO switch with a thin ferroelectric oxide waveguide core with a thickness about the diameter of a single mode fiber optic cable core, e.g., 8–10 microns, should satisfy the need for an optical switch in an all optical network, there are problems in achieving this thickness. There are three processes that have been investigated, the Metal-Organic Chemical Vapor Deposition (MOCVD) process, pulsed laser deposition (PLD), and the sol-gel process. Because the sol-gel process is much cheaper, producing a thin film core by a sol-gel process is preferred. Thus there has been much research into producing a waveguide core with about 8–10 microns in thickness using the sol-gel process on ferroelectric materials. However, there have been difficulties fabricating a thin ferroelectric oxide waveguide slab over about 1 micron in thickness for large size substrates, because when the sol-gel film reaches its critical thickness, the film cracks.

Even if a thin ferroelectric oxide waveguide core with a thickness over about 1 micron could be produced, there are still other problems in using the thin core in a switch. There would be coupling problems between the fiber optic cable and the thinner waveguide. In addition, the collimating lens is typically placed external to the waveguide, and hence causes significant reflection and coupling loss of the light signal.

Therefore, as the demand for high speed optical switches grows, there is a need for an electro-optical switch having a thin film ferroelectric oxide waveguide produced from the relatively inexpensive sol-gel process, that has less of the problems associated with conventional all optical switches, and that can provide switching for high data transmission rates using a single mode light signal.

SUMMARY OF THE INVENTION

The present invention provides for an electro-optical switch having a thin ferroelectric oxide film waveguide. The thickness of the core of the ferroelectric oxide film waveguide is chosen to allow propagation of a single mode light signal and ease in handling.

An embodiment of the present invention includes a single mode optical switch. The optical switch includes: a single mode planar optical waveguide having a thin ferroelectric oxide film for propagating a single mode of light; a coupler, e.g., grating or prism, adjoining the single mode planar optical waveguide for coupling a part of the single mode of light from an optical fiber to the single mode optical waveguide; an electrically formed lens in the single mode planar optical waveguide for collimating the single mode of light from the coupler; and a switching module comprising an electrically formed prism in the single mode planar optical waveguide, for switching the single mode of light.

An aspect of the present invention includes a thin film optical switch. The optical switch includes: a waveguide; a first electrode affixed to the waveguide; a second electrode affixed to the waveguide and positioned opposite the first electrode, where the first and second electrodes are used to form an electro-optic lens in the thin film core; and a substrate affixed to the second electrode. The waveguide includes: a thin film core having a first lead lanthanum zirconium titanate (PLZT) material for propagating a single mode of light, where the core has a thickness from 1 to 9 microns, inclusive; and a clad affixed to the core, where the clad includes a second lead lanthanum zirconium titanate (PLZT) material;

Another embodiment of the present invention includes a method for fabricating a single mode optical switch using a sol-gel process. A bottom clad layer is formed by repetitively spin coating and rapid thermal annealing a first lead lanthanum zirconium titanate (PLZT) material on a surface of a bottom electrode. Next, by repetitively spin coating and rapid thermal annealing a second PLZT material on the bottom clad layer, a core layer about 1 to 10 microns, inclusive, in thickness is formed. Lastly, a top clad layer is created on the core layer;

Another aspect of the present invention includes an optical switch. The optical switch includes: a single mode optical waveguide having a thin ferroelectric oxide film for propagating a single mode of light; a means for transferring a part of the single mode of light from an optical fiber to the single mode optical waveguide; a means for collimating the single mode of light in the single mode optical waveguide using a pair of electrodes; and a means for connecting a top electrode of the pair of electrodes to an external voltage source.

These and other embodiments, features, aspects and advantages of the invention will become better understood

BRIEF DESCRIPTION OF THE DRAWINGS

FIGS. 4-1 to 4-10 illustrate the process of making an optical switch similar to FIG. 3 of an embodiment of the present invention; and FIGS. 5-1 to 5-4 show part of the process in building a thin film switch with a built-up circuit of another embodiment of the present invention.

DETAILED DESCRIPTION OF THE INVENTION

In the following description, numerous specific details are set forth to provide a more thorough description of the specific embodiments of the invention. It is apparent, however, to one skilled in the art, that the invention may be practiced without all the specific details given below. In other instances, well known features have not been described in detail so as not to obscure the invention.

Figure 1:
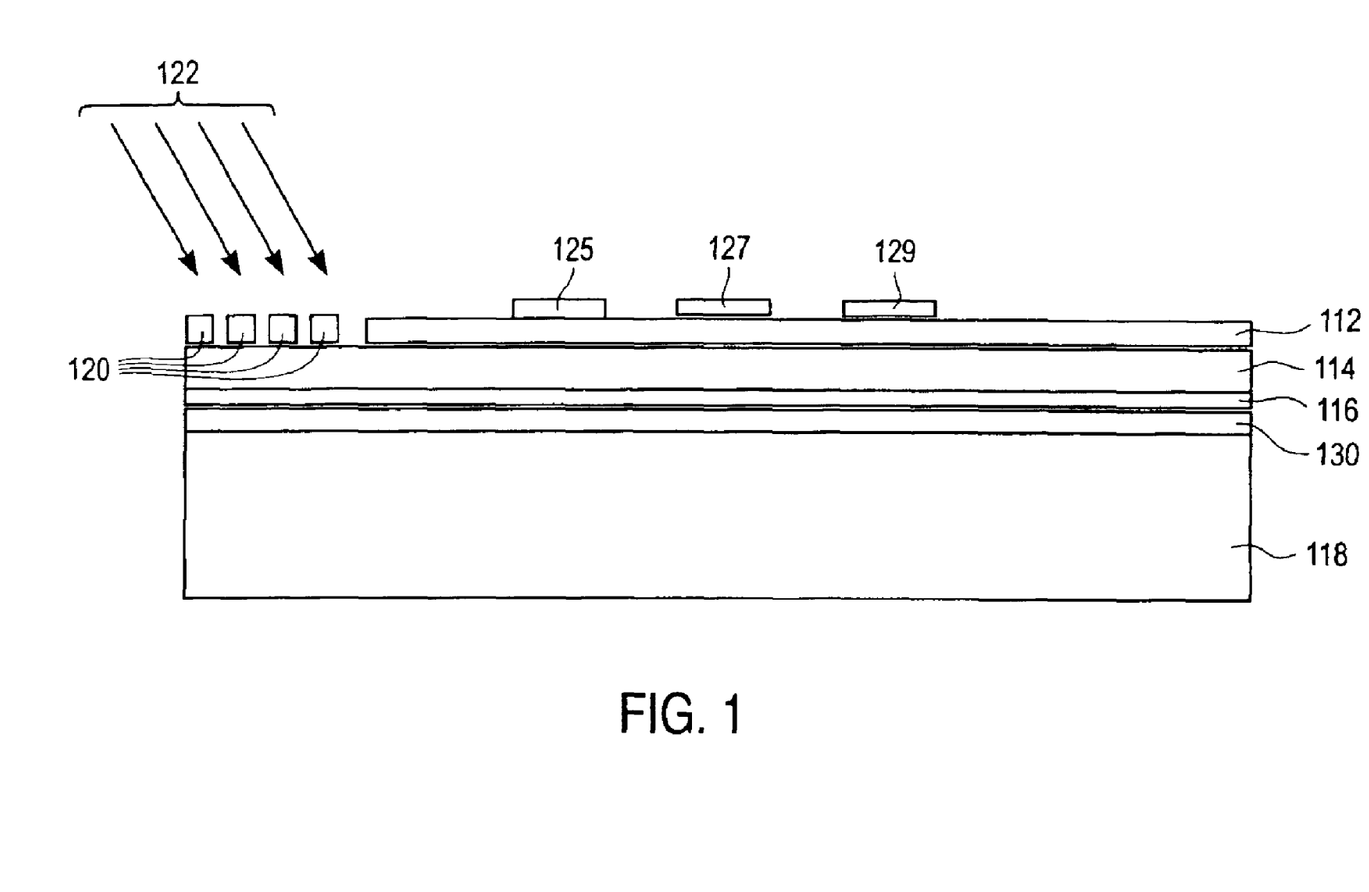
FIG. 1 is a simplified side-view of part of a thin film electro-optical switch of an embodiment of the present invention.

FIG. 1 is a simplified side-view of part of a thin film electro-optical switch of an embodiment of the present invention. An optical waveguide having a top cladding 112, a thin ferroelectric oxide core 114, and a bottom cladding 116 is formed above a lanthanum aluminate ($LaAlO_3$), magnesium oxide (MgO) or Strontium Titanate ($SrTiO_3$) substrate 118. A grating coupler 120 is located on one end of the thin ferroelectric oxide core 114. The grating coupler 120 receives the signal mode light signal 122 from an optical fiber (not shown) and sends the signal mode light signal 122 to the thin ferroelectric oxide core 114. The top electrodes 125, 127, and 129 above the top clad layer 112 work in conjunction with opposing blank bottom electrode 130, below bottom clad layer 116, to bend the light signal in the thin ferroelectric oxide core 114, when needed. In another embodiment silicon (Si) is used as substrate 118.

The core 114 of the single mode waveguide of FIG. 1 has a thickness that is dependant on the refraction indexes of the core 114, i.e., $n_1$, and clad (112, 116), i.e., $n_2$. The theoretical maximum thickness of a core for a single mode transmission only, i.e., "d," is given by the equation:

$$\frac{d}{\lambda} < \frac{1}{2\sqrt{n_1^2 - n_2^2}} \qquad \text{[Equation 1]}$$

where $\lambda$ is the wavelength of the light source. For a thickness equal to or greater than d, the waveguide can carry one or more modes. Thus, while for a transmission of a single mode of light, the thickness of the core can be greater than "d", the core's thickness should be at or near to "d" in order to minimize the propagation of more than one mode. For example, if a 1310 nm light source is used with a barium titanate as core (refractive index of 2.4) and silica as clad (refractive index of 1.5), then the maximum thickness "d" of the barium titanate for a single mode wave propagation only is about 350 nm. This is a thickness that can be easily fabricated by the sol-gel process. However, this very thin core is too thin to use. A more practical thickness is a core about 1 micron or thicker. The above formula indicates as the core gets thicker, the difference between the core and clad refractive indexes gets smaller. Hence for a 1 micron thick core, the difference between the core and clad refractive indexes is about 0.1.

Table I shows the thickness of the ferroelectric oxide film (columns 3 and 4) for different refractive indexes of the clad (n2) and core (n1=2.4 and n1=2.5). The material given for the core, i.e., barium titanate and PLZT, are merely illustrative of materials that have indexes, n1=2.4 and n1=2.5, respectively, and other materials with these indexes may also be used. The first column gives an example of a material that could be used as a clad with the refractive index of the clad (n2) in the second column. For example, lithium niobate ($LiNbO3$) is an example of a clad that could be used for n2=2.3. Again the examples in the first column are merely illustrative and other materials with the same refractive indexes for n2 may also be used.

TABLE I

| An example of a clad material for the given n2 on the same row | Refractive Index ($n_2$) of Clad | Thickness of Barium Titanate Core ($n_1$ = 2.4) (μm) | Thickness of PLZT core ($n_1$ = 2.5)(μm) | Barium Titanate Core: n1−n2 | PLZT Core: n1−n2 |
|---|---|---|---|---|---|
| Pyrex glass | 1.47 | 0.34262291 | 0.32143968 | | |
| Fused Quartz($SiO_2$) | 1.55 | 0.354736066 | 0.33137828 | | |
| Quartz crystal($SiO_2$) | 1.65 | 0.372953952 | 0.34608266 | | |
| Sapphire($Al_2O_3$) | 1.76 | 0.398360899 | 0.36609407 | | |
| | 2.2 | 0.677671846 | 0.54739875 | | |
| $LiNbO_3$ | 2.3 | 0.948122445 | 0.66340347 | 0.1 | |
| | 2.35 | 1.333771858 | 0.7620735 | | |
| | 2.37 | 1.718278436 | 0.81691562 | | |
| | 2.39 | 2.969925806 | 0.88626293 | 0.01 | |
| | 2.395 | 4.197918944 | 0.90665562 | | |
| | 2.397 | 5.418360169 | 0.91522883 | | |
| | 2.399 | 9.382919313 | 0.9240574 | 0.001 | |
| | 2.4 | | 0.92857143 | | 0.1 |
| | 2.45 | | 1.30654916 | | |
| | 2.47 | | 1.68335043 | | |
| | 2.49 | | 2.90979963 | | 0.01 |
| | 2.495 | | 4.11301798 | | |
| | 2.497 | | 5.30882066 | | |
| | 2.499 | | 9.19330753 | | 0.001 |

Table I shows that as the difference of refractive index between clad and core gets smaller the ferroelectric film gets thicker. When the difference of refractive index between clad and core (i.e., n1−n2) is 0.1, the thickness of the core for a single-mode symmetrical slab waveguide is about 1 μm, i.e., 1 micron, for both a Barium Titanate core and a PLZT core. If the difference of refractive indexes between core and clad (i.e., n1−n2) is only 0.01, the thickness of the core is 3 μm. For a 9 μm core, the difference of refractive indexes (i.e., n1−n2) is about 0.001. While a core of 9 microns is desirable, there are fabrication problems with a 0.001 refractive index difference. To get this small difference, impurities need to be doped into the core and clad. However, for a slab waveguide, it is very difficult to diffuse impurities into a material in a sandwich configuration, where the top clad and bottom clad need to have the same refractive index, unless the impurity concentration is controlled carefully before the waveguide material is deposited. Thus in one embodiment of the present invention a slab thickness from about 1 micron to less than about 9 microns, inclusive, is preferred.

In a preferred embodiment the core 114 is PLZT (lead lanthanum zirconium titanate) (8/65/35) and the top 112 and bottom 116 clads are PLZT (12/65/35). In another embodiment the core 114 is PLZT (12/40/60) and the top 112 and bottom 116 clads are PLZT (15/40/60). In yet another embodiment the core 114 is PLZT (8/40/60) and the top 112 and bottom 116 clads are PLZT (12/40/60). The formula of PLZT (x/y/1−y) is:

$$Pb_{1-x}La_x(Zr_yTi_{1-y})_{1-x/4}O_3 \qquad [\text{Equation 2}]$$

For example, PLZT (12/65/35) means x=0.12 and y=0.65 (where 1−y=0.35). The same formula is applicable to PLZT (8/65/35), (12/40/60), and (15/40/60), etc.

The refractive indexes of PLZT (8/65/35) and (12/65/35) for two light wavelengths is given in Table 2 below. For a 1550 nm light source the difference of refractive indexes between the core and clad is (2.05−2.04)=0.01, which according to Equation 1 above should give a core thickness of about 3.8 microns. For a 635 nm light source the difference of refractive indexes between the core and clad is (2.1548−2.1478)=0.007, which according to Equation 1 above should give a core thickness of about 1.8 microns.

TABLE 2

|  | Wavelength = 1550 nm | Wavelength = 635 nm |
| --- | --- | --- |
| 8/65/35 | 2.05 | 2.1548 |
| 12/65/35 | 2.04 | 2.1478 |

While in the preferred embodiment PLZT was used for the core and clad of the waveguide, other embodiments may include lithium niobate, barium titanate, strontium barium niobate, or lead zirconium titanate (PZT) for the core or clad or both.

Because the light signal comes from a fiber optic cable about 8 to 10 microns in diameter and for example, about 1310 nm or 1550 nm, in wavelength, the grating coupler 120 provides coupling from the fiber optic cable to the thin film ferroelectric oxide waveguide, when the waveguide is thinner than the fiber optic cable, for example, when the waveguide is about 1 to 7 microns thick. Although a grating coupler has an efficiency of about 80%, any significant coupling loss can be compensated for by using a laser pump at the other end of the switch to regenerate the switched light signal.

In FIG. 1 the single mode light signal 122 comes from a single mode fiber optic cable (not shown) and enters the single mode thin film ferroelectric oxide waveguide 114 via grating coupler 120. A voltage is applied across electrodes 125 and 130 to form a collimating lens from the electric field, which collimates the light signal in the waveguide coming from the grating coupler 120. In another embodiment one, two, or three of the electrode pairs: (125, 130), (127, 130), or (129, 130), or any combination thereof, may be used to collimate the light. The collimated light signal is then switched in a switch sub-module (not shown) using other electro-optical prisms (not shown) in the thin film ferroelectric oxide waveguide. In an alternative embodiment, the electrode pair (125, 130) is used to form the collimating lens and the other two electrode pairs (127, 130) and (129, 130) are used in switching the collimated light signal in the switch sub-module.

Figure 2:
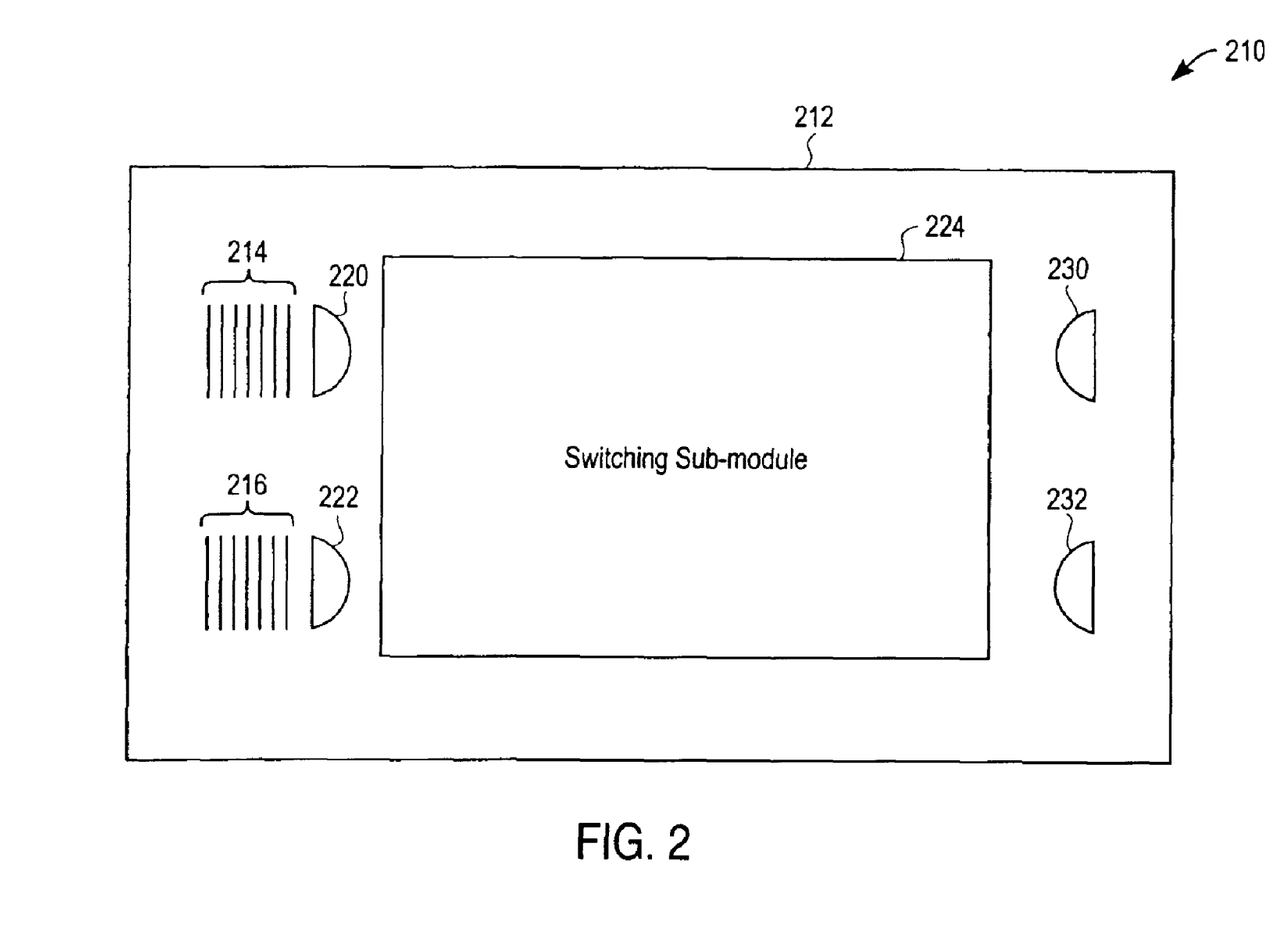
FIG. 2 is a simplified top-view of a thin film electro-optical switch of an embodiment of the present invention.

FIG. 2 is a simplified top-view of a thin film electro-optical switch 210 of an embodiment of the present invention. A first light signal from a first single mode fiber optic cable (not shown) enters the thin film ferroelectric oxide waveguide 212 via grating coupler 214. Next, the first light signal is collimated by electro-optical collimating lens 220, and the collimated light signal then propagates to switching sub-module 224. The first light signal leaves switching sub-module 224 and then goes to either electro-optical diverging (concave) lens 230 or 232. If the light signal goes to diverging lens 230, the light signal exits the thin film electro-optical switch 210 and enters a second fiber optic cable (not shown). If the light signal goes to diverging lens 232, the light signal exits the thin film electro-optical switch 210 and enters a third fiber optic cable (not shown). The grating coupler 214 is the top view of grating coupler 120 of FIG. 1. The collimating lens 220 may be formed by the electrode pair (125, 130) of FIG. 1. The switching sub-module has a plurality of electrically formed lenses which can switch the collimated light from collimating lens 220 to diverging lens 230 or 232.

Similarly, a fourth single mode fiber optic cable (not shown) is connected to the thin film ferroelectric oxide waveguide 212 via grating coupler 216. A second light signal entering the waveguide 212 via grating coupler 216 is collimated by electro-optical collimating lens 222 and the collimated light signal then propagates to switching sub-module 224. The second light signal leaves switching sub-module 224 and then goes to either diverging (concave) lens 230 or 232. From the diverging lens, e.g., lens 230 or 232, the light signal exits the thin film electro-optical switch 210 and enters the second or third fiber optic cable (not shown).

Figure 3:
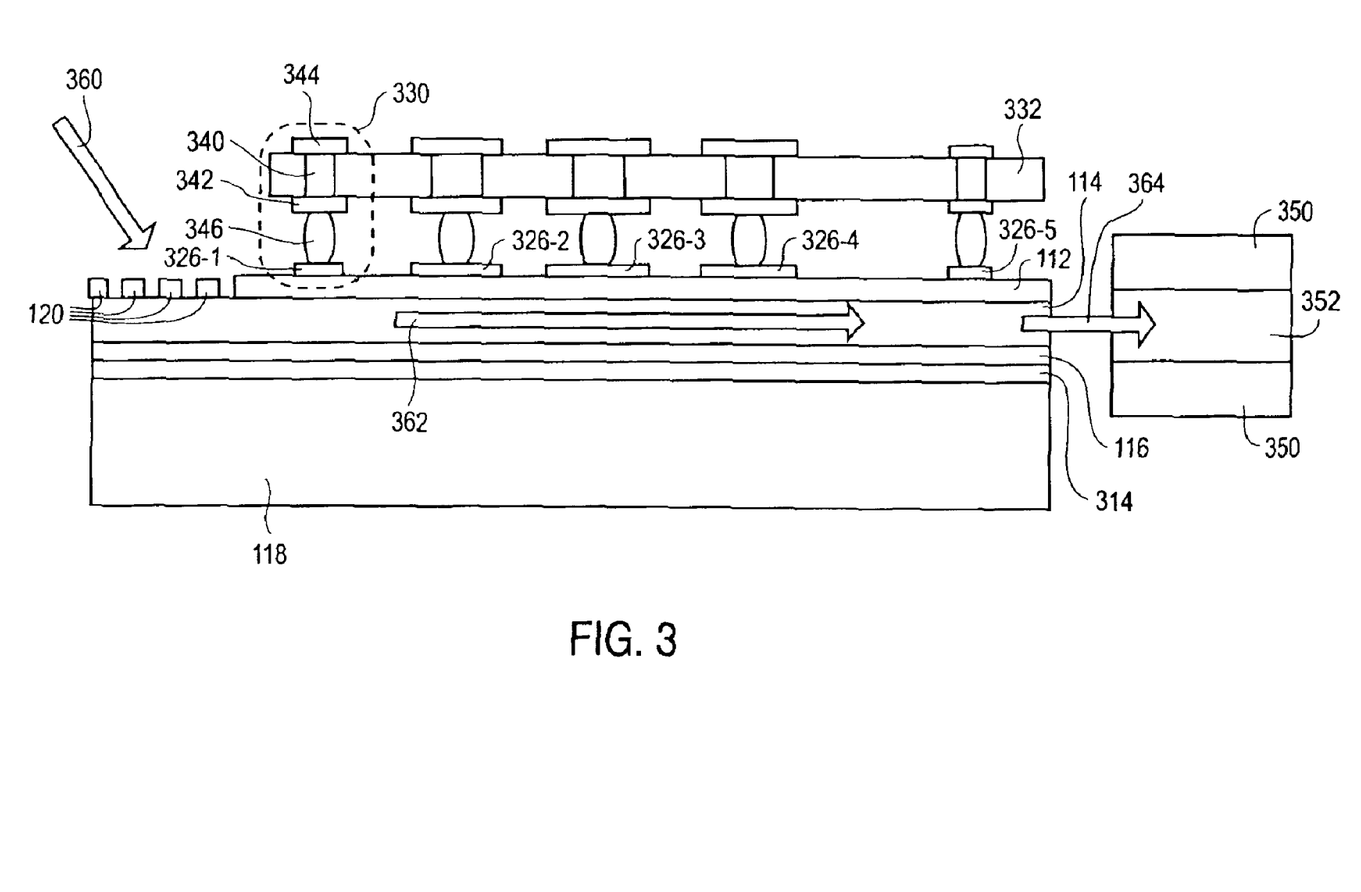
FIG. 3 is a structural side view of a thin ferroelectric oxide film switch of another embodiment of the present invention.
Figure 41:
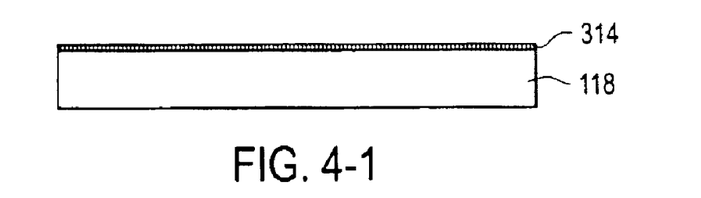
Figure 42:
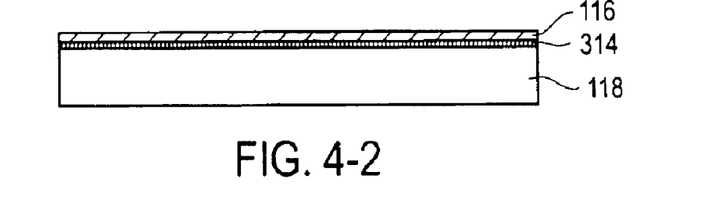
Figure 43:
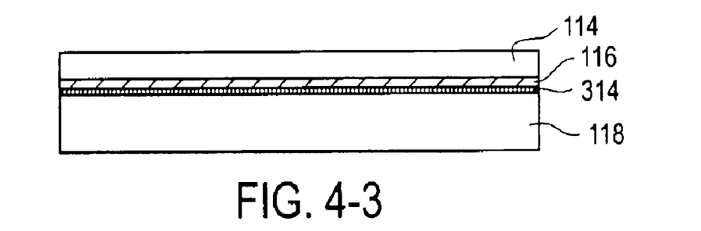
Figure 44:
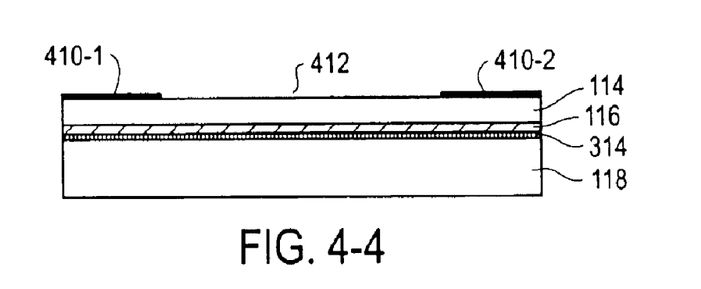

FIG. 3 is a structural side view of a thin ferroelectric oxide film switch of another embodiment of the present invention. The switch in FIG. 3 has some parts similar to FIG. 1, and those parts are given the same numbers as labels. Note the fiber optic cable having core 352, and clad 350, is not part of the switch. The substrate 118 has deposited on it a blank bottom electrode 314. The bottom clad 116 is deposited on top of the bottom electrode 314. The ferroelectric oxide film 114 is deposited on top of the bottom clad 116 to form the core 114 of the waveguide. The top clad 112 is then formed above the core 114, and the grating coupler 120 is created on top of core 114. Top electrodes 326-1 to 326-5 are formed above clad 112. A flexible substrate 332 has a plurality of through holes formed in it. In each through hole is a via, e.g. 340. A through-hole contact is formed using this via, e.g., 340, and a top metal contact, e.g., 344, and a bottom metal contact, e.g., 342. The flexible substrate 332 having the vias and metal contacts, is connected to the top electrodes 326-1 to 326-5, by z-connection solder joints, e.g. 346. For example, the bottom contact 342 of via 340 is soldered using z-connection solder joint 346 to top electrode 326-1. The top metal contact 344 is connected to the external voltage source to produce an electric field between top electrode 326-1 and bottom electrode 314, which is connected to the same external voltage source. The structure 330 having top metal contact 344, via 340, bottom contact 342, z-connection solder joint 346, and top electrode 326-1, is similarly repeated for each of the remaining top electrodes 326-2 to 326-5.

In FIG. 3 the single mode light signal 360 comes from a first cylindrical single mode fiber optic cable (not shown) and is coupled by grating coupler 120 into the ferroelectric oxide film 114. A light signal from the grating coupler 120 passes through an electrically formed collimator lens produced by, for example, a voltage on the electrode pair (326-1 and 314). The collimated light signal 362 is switched by the electric fields in the ferroelectric oxide film 114 produced by the switching sub-module, having the electrode pairs, e.g., (326-2 and 314), (326-3 and 314), and (326-4 and 314). The collimated light signal 362, after being switched, passes through a converging lens, e.g., converging lens 230 in FIG. 2, formed by electrode pair, e.g., (326-5, 314). Alternately, the collimated light signal 362, after being switched, passes through a converging lens formed by another electrode pair (not shown), e.g., converging lens 232 in FIG. 2. Next, the light signal 364 leaves the ferroelectric oxide film 114 and enters a second cylindrical single mode fiber optic cable having core 352 and clad 350. As the light signal 364 goes from a thin core film 114 to a thicker core film 352, direct edge coupling can be used with very little light loss.

Some of the advantages of the thin film electro-optical switch of FIG. 3 are: that the complicated and precise process of aligning the first fiber optic cable's thicker core (not shown) to the switch's thin waveguide core 114 via an intermediary lens is not needed, because of use of the grating coupler 120; secondly, a collimating lens embedded inside the waveguide core 114 reduces significantly the reflection and coupling losses which occur when an external collimating lens is used instead of an internal one; and lastly, the use of a single mode thin ferroelectric oxide material in an electro-optical switch provides a fast response time for giga-bit per second optical networks.

FIGS. 4-1 to 4-9 illustrate the process of making an optical switch similar to FIG. 3 of an embodiment of the present invention. Where applicable the labels in FIG. 3 are used. A sol-gel process is used, which has three basic stages: forming a particulate suspension, i.e., a "sol"; depositing the liquid on a substrate to form a gel, e.g., spin coating; and firing to form a desired thin film. The process starts with a 3 inch lanthanum aluminate substrate 118. In other embodiments other substrates such as magnesium oxide (MgO) or strontium titanate (SrTiO3) may be used as substrate 118. FIG. 4-1 shows a lanthanum nickel oxide blank bottom electrode layer 314 that is formed by spin coating a lanthanum nickel oxide sol-gel precursor on top of substrate 118 and then heating the film in an infrared (IR) furnace, i.e., rapid thermal annealing (RTA).

After the bottom electrode 314 is created, the optical waveguide having bottom clad 116, core 114, and top clad 112 is created. The refractive index of the core is slightly larger than the refractive index of the clad layers, e.g., Table 2 above. FIG. 4-2 shows a PLZT (12/65/35) bottom clad layer 116 formed by using repetitive spin coating and rapid thermal annealing on top of blank bottom electrode layer 314. A layer of about 0.35 microns to 0.5 microns is formed by each spin coat and rapid thermal annealing cycle, until a bottom clad 116 thickness of about 1 to 4 microns is reached. FIG. 4-3 shows about a 2 to 7 micron PLZT (8/65/35) core layer 114 formed by using repetitive spin coating and rapid thermal annealing on top of bottom clad layer 116. Next a tungsten (W) or gold (Au) metal layer is deposited on top of core layer 114. Photo lithography is used to etch the metal from area 412. FIG. 4-4 shows the etched metal area 412 and the remaining metal layer segments 410-1 and 410-2. These metal layer segments 410-1 and 410-2 cover the grating coupler (or prism coupler) areas. FIG. 4-5 shows about a 1 to 4 micron PLZT (12/65/35) top clad layer 112 formed by using repetitive spin coating and rapid thermal annealing on top of core 114 in the etched metal area 412. In other embodiments the core is any thickness equal to or greater than 1 micron, for example, about 1 to 9 microns inclusive. In addition the clads may be any value equal to greater than 1 micron and is not limited to the ranges 1 to 4 microns.

Figure 45:
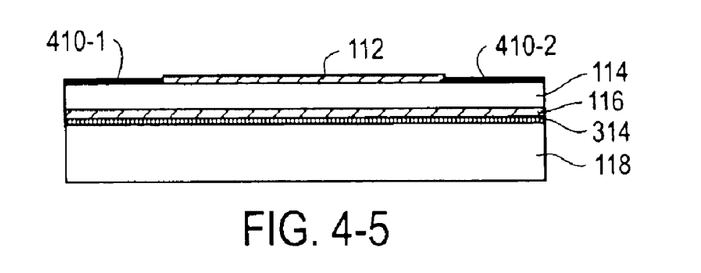
Figure 46:
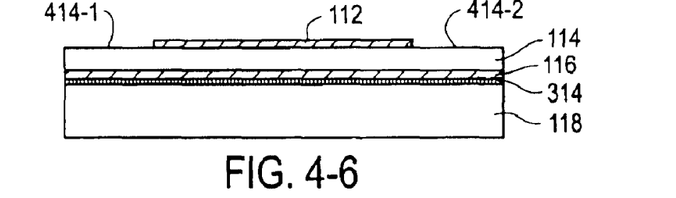
Figure 47:
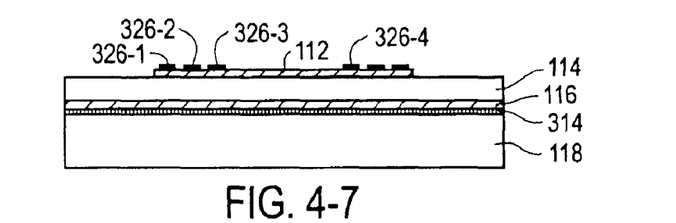

FIG. 4-6 shows the structure of FIG. 4-5 after the metal areas 410-1 and 410-2 have been removed by etching. Next by seed metal deposition, photo lithography, and electroplating metal, the top electrodes, e.g., 326-1, 326-2, 326-3, 326-4, etc., are formed on top of top clad layer 112. The top electrodes and the bottom blank electrode are used form with their electric fields, for example, deflectors (such as prisms) or collimators or electro-optic other lenses.

In the preferred embodiment the core/clad pair included PLZT (8/65/35) for the core 114 and PLZT (12/65/35) for the clad layers 112 and 116. In another embodiment the core/clad pair includes PLZT (12/40/60) for the core and PLZT (15/40/60) for the clad layers. In yet another embodiment the core/clad pair includes PLZT (8/40/60) for the core and PLZT (12/40/60) for the clad layers. In a further embodiment PLZT (7/62/38) is used for the core.

Figure 48:
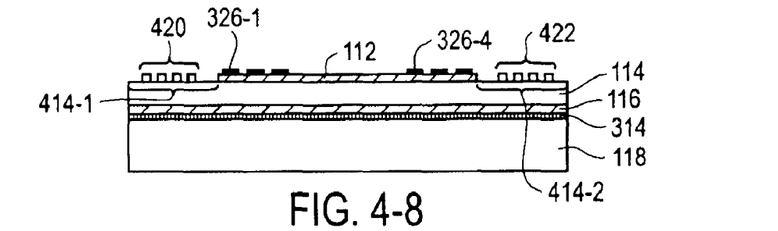

FIG. 4-8 shows grating couplers 420 and 422 over the core 114 in areas 414-1 and 414-2, respectively. The grating couplers are formed by coating and imaging a dielectric, such as photoepoxy, over areas 414-1 and 414-2.

Figure 49:
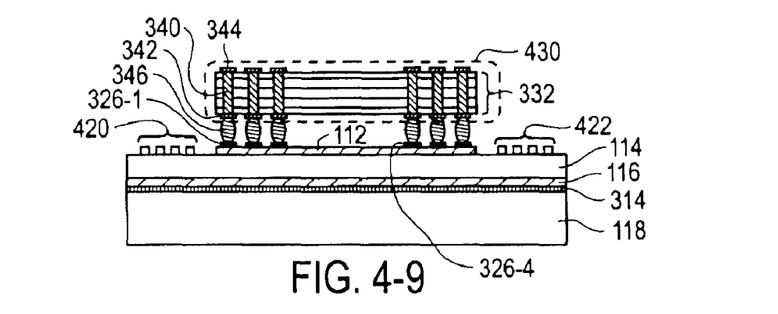

FIG. 4-9 shows a flexible circuit 430 bonded by z-connection solder joints, e.g., 346, or transient liquid bonding (not shown) to the top electrodes, e.g., 326-1, 326-4. The flexible circuit 430 includes the flexible substrate 332, top metal contacts, e.g., 344, through-hole vias, e.g., 340, and bottom contacts, e.g., 342.

Figure 410:
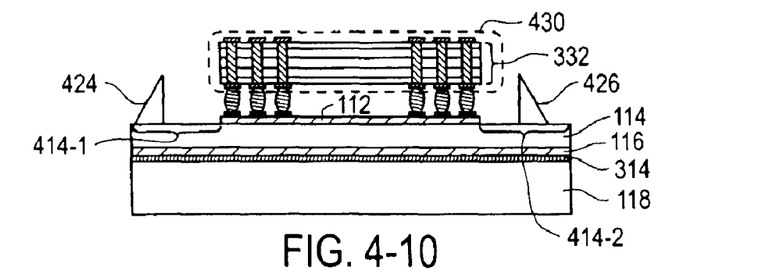

FIG. 4-10 shows the thin film switch of FIG. 4-9 with prism couplers 424 and 426 in place of grating couplers 420 and 422, respectively. The prisms are diced out of a substrate and then fixed by external fixtures over areas 414-1 and 414-2.

In another embodiment, the structure 430 can be built-up directly on the top electrodes, e.g., 326-1, 326-2, 326-3, and 326-4. The process starts with FIG. 4-7. FIG. 5-1 to 5-4 show the rest of the process of building a thin film switch with a built-up circuit.

Figure 51:
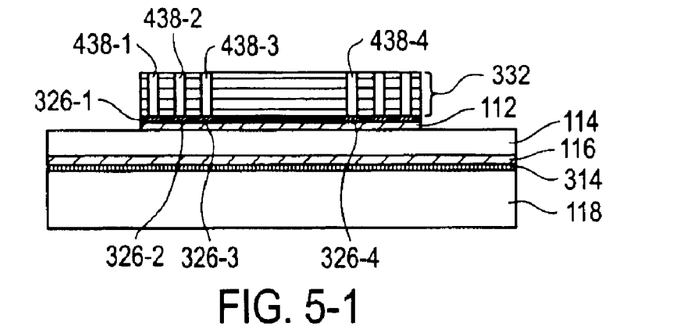
Figure 52:
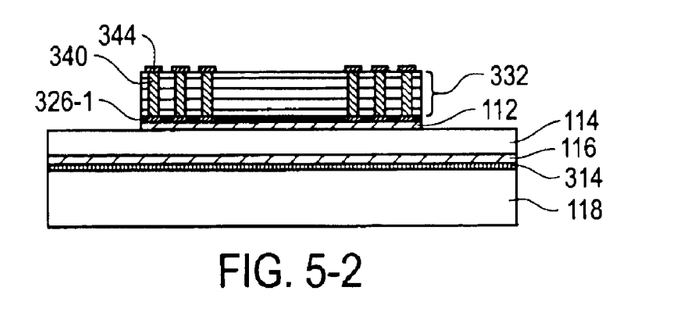

FIG. 5-1 shows forming the dielectric structure 332 on top of the top electrodes, e.g., 326-1, 326-2, 326-3, and 326-4. The dielectric may be photoimagible epoxy or polyimide and is formed on the top electrodes by a lithography process. When an ordinary dielectric is used, the through holes, e.g., 438-1, 438-2, 438-3, and 438-4, aligned over the top electrodes, e.g., 326-1, 326-2, 326-3, and 326-4, respectively, are created by a reactive ion etching (RIE) plasma process. FIG. 5-2 shows the metal filled through holes, e.g., via 340, and top contacts, e.g., 344, that have been added to the dielectric 332. Thus an external voltage is connected to the top electrodes, e.g., 326-1, by top contact 344 and via 340.

Figure 53:
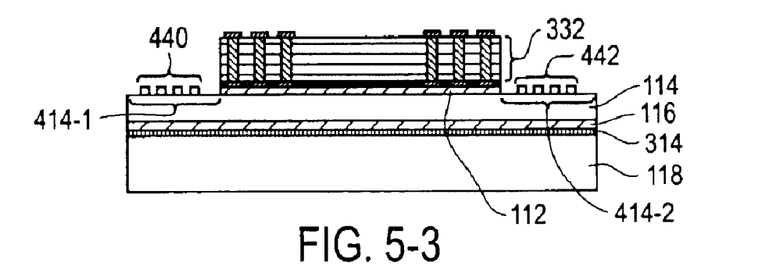
Figure 54:
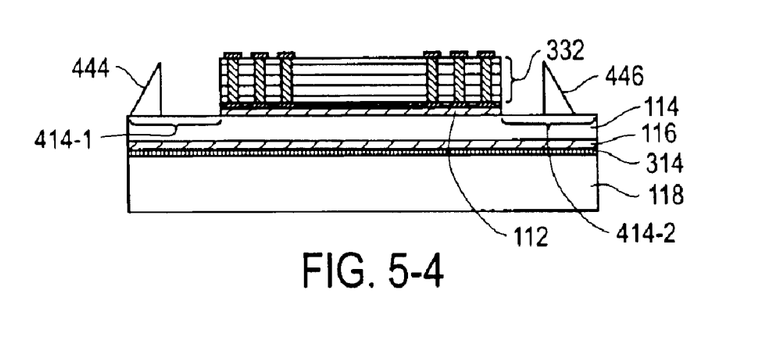

FIG. 5-3 shows grating couplers 440 and 442 over the core 114 in areas 414-1 and 414-2, respectively. The grating couplers are formed by coating and imaging a dielectric, such as photoepoxy, over areas 414-1 and 414-2. FIG. 5-4 shows the thin film switch of FIG. 5-3 with prism couplers 444 and 446 in place of grating couplers 440 and 442, respectively. The prisms are diced out of a substrate and then fixed by external fixtures over areas 414-1 and 414-2.

The specification and drawings are provided for illustrative purposes. It will be evident that additions, subtractions, deletions, and other modifications and changes may be made thereunto without departing from the broader spirit and scope of the invention as set forth in the claims.

What is claimed is:

1. A single mode optical switch comprising:
   a single mode optical planar wave guide, comprising a thin ferroelectric oxide film, for propagating a single mode of light;
   a coupler adjoining said single mode optical waveguide for coupling at least a portion of said single mode of light from an optical fiber to said single mode optical planar waveguide;
   a structure for creating a first electrically formed lens in said single mode optical planar waveguide for collimating said single mode of light from said coupler; and
   a switching module comprising a structure for creating an electrically formed prism in said single mode optical planar waveguide, for switching said single mode of light.

2. The single mode optical switch of claim 1 wherein said coupler comprises a grating coupler or a prism coupler.

3. The single mode optical switch of claim 1 further comprising a structure for creating a second electrically formed lens for converging said switched single mode of light.

4. The single mode optical switch of claim 1 further comprising another optical fiber directly aligned with said single mode optical planar waveguide for receiving said switched single mode of light.

5. The single mode optical switch of claim 1 wherein said thin ferroelectric oxide film comprises a core and a clad, wherein the difference between a refractive index of said core and a refractive index of said clad is equal to or less than about 0.1.

6. The single mode optical switch of claim 1 wherein said thin ferroelectric oxide has a thickness of equal to or greater than about 1 micron ($\mu$m) and is produced by a sol-gel process.

7. The single mode optical switch of claim 1 further comprising:
   a substrate adjoining said single mode planar optical waveguide, said substrate comprising a bottom electrode, said bottom electrode electrically connected to an external voltage source; and
   a top electrode coupled to said single mode planar optical waveguide and located opposite said bottom electrode for creating at least part of said first electrically formed lens.

8. The single mode optical switch of claim 1 further comprising:
   an electrode of said first electrically formed lens structure, said electrodes coupled to said single mode planar optical waveguide;
   a flexible substrate coupled to said waveguide, comprising a through-hole contact; and
   a z-connection solder joint, comprising a top end and a bottom end, said top end affixed to said through-hole contact, and said bottom end connected to said electrode.

9. The single mode optical switch of claim 1 further comprising:
   an electrode of said first electrically formed lens structure, said electrodes coupled to said single mode optical waveguide; and a built-up substrate, comprising a via, said via connected to said electrode.

10. The single mode optical switch of claim 1 wherein said thin ferroelectric oxide has a thickness of between about 1 $\mu$m to about 9 $\mu$m, inclusive.

11. The single mode optical switch of claim 1 wherein said thin ferroelectric oxide film is selected from the group consisting of: lithium niobate, barium titanate, strontium barium niobate (SBN), lead zirconium titanate (PZT), and lead lanthanum zirconium titanate (PLZT).

12. The single mode optical switch of claim 1 wherein said substrate is selected from the group consisting of: Silicon (Si), Lanthanum aluminate (LaAlO3), Strontium titanate (SrTiO3), and Magnesium oxide (MgO).

13. An optical switch comprising:
   a single mode optical waveguide, comprising a thin ferroelectric oxide film, for propagating a single mode of light;
   light coupling means for transferring at least a portion of said single mode of light from an optical fiber to said single mode optical waveguide;
   light collimation means for collimating said single mode of light in said single mode optical waveguide using a pair of electrodes; and an electrical pathway for connecting a top electrode of said pair of electrodes to an external voltage source.

14. The optical switch of claim 13 further comprising light deflecting means for switching said single mode of light in said single mode optical waveguide.

15. The optical switch of claim 13 wherein said thin ferroelectric oxide film is about 2 to 7 microns inclusive in thickness.

* * * * *